Feb. 4, 1958 W. R. HICKS 2,822,425
BOOK WITH SOUND TRACK SPEAKING HEAD GUIDED BY OPPOSITE PAGE
Filed Sept. 14, 1954 2 Sheets-Sheet 1

INVENTOR.
Walter R. Hicks
BY
ATTORNEYS.

Feb. 4, 1958    W. R. HICKS    2,822,425
BOOK WITH SOUND TRACK SPEAKING HEAD GUIDED BY OPPOSITE PAGE
Filed Sept. 14, 1954    2 Sheets-Sheet 2

INVENTOR.
Walter R. Hicks
BY Emery, Varney,
Whittemore & Dix
ATTORNEYS

United States Patent Office 2,822,425
Patented Feb. 4, 1958

2,822,425

BOOK WITH SOUND TRACK SPEAKING HEAD GUIDED BY OPPOSITE PAGE

Walter R. Hicks, Manhasset, N. Y.

Application September 14, 1954, Serial No. 456,044

4 Claims. (Cl. 179—100.1)

This invention relates to educational apparatus having a group of sound strips and a reproducer that is traversed manually along the sound strips.

It is an object of the invention to provide an improved educational apparatus in which supporting means for sound tracks also guide a manually moved reproducer as it travels over the sound tracks. In the preferred construction, the sound tracks are on flexible sheets which are bound together in a book, and the fold where the sheets come together when the book is open acts as the guide for the reproducer when it is being moved along a sound track on one of the open pages.

The invention may be made with different types of reproducing apparatus. They may be of a unitary construction having the reproducer head, amplifier, batteries and speaker contained in a single housing; or the reproducer may have the reproducer head separated from the amplifier and speaker unit. In one form of the invention, the speaker unit is omitted and the apparatus makes use of the speaker and some of the audio-stage amplifiers of a radio receiver, though the radio receiver does not comprise a part of the invention.

One of the uses of the invention is in teaching children their letters or the names of familiar objects. For example, separate sheets may contain various letters of the alphabet, and the sound strip on the respective pages has sound signals that reproduce the phonetic sound of the letter represented on the page. Similarly, other legends, such as pictures, can be printed on the sheets; and the sound track can give the name of the object represented in the picture. In addition to the teaching of letters and the names of objects, the invention can be used to teach reading, by having the sound track tell the pupil the pronunciation of the particular words that are printed on a page. In this connection, the invention is also useful for teaching foreign languages to either children or adults.

This application is a continuation in part of my co-pending application, Serial No. 248,119, filed September 25, 1951.

Other objects, features and advantages of the invention will appear or be pointed out as the description proceeds.

In the drawing, forming a part hereof, in which like reference characters indicate corresponding parts in all the views.

Figure 1:
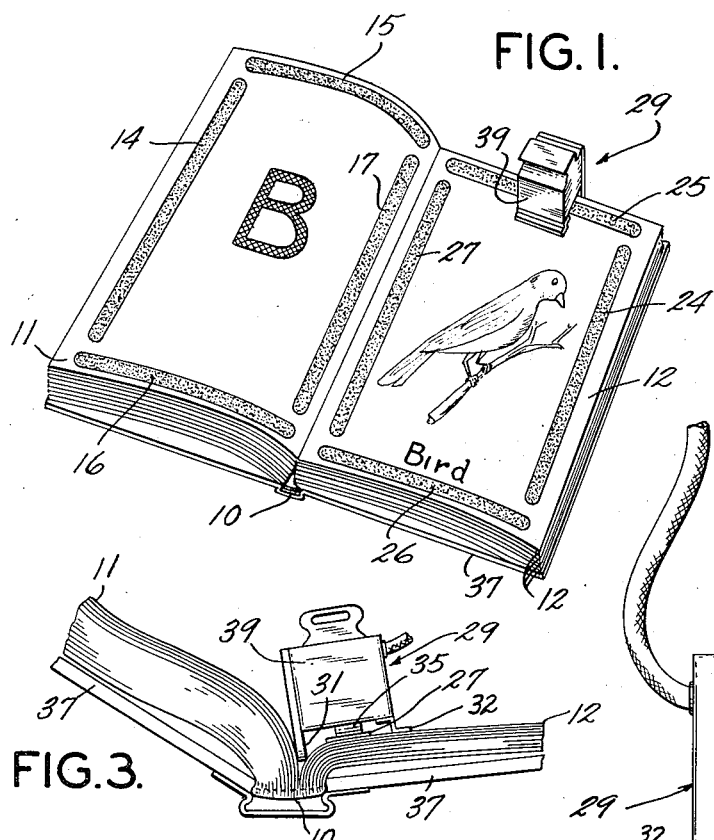
Figure 1 is a perspective view showing a sound reproducer located in a working position on top of a plurality of sheets which have sound tracks thereon and which are bound together as a book.

Figure 1 shows a plurality of flexible sheets or pages connected together by a binding 10 in the manner of a conventional book. The book is shown open. The sheets or pages on the left-hand side of the opening are indicated by the reference character 11, and those on the right-hand side of the opening by the reference character 12. The binding is of the type in which the successive sheets are held in contact with one another along their bound edges so that the marginal edges of the sheets adjacent to the binding meet one another in an angular relation. Although some features of the invention can be used with bindings of the loose leaf or ring type, such a binding limits the number of marginal edges to which the invention can be applied and does not provide the rigid center guide means that is obtained with the fixed binding illustrated in Figure 1.

The top sheet 11 has a sound strip 14 along its forward margin, a sound strip 15 along its upper margin and a sound strip 16 along its lower margin. At the rearward margin of the sheet, adjacent to the binding, there is another sound strip 17. These sound strips 14–17, shown in Figure 1, are magnetic tapes secured to the sheet 11 by adhesive. This provides an economical way of supplying the sheets with sound tracks, but the sheets can be of special manufacture with the magnetic material applied directly to the sheet 11 without any tape as a carrier for the magnetic material.

The top sheet 12 has sound tracks 24, 25, 26 and 27 corresponding to the sound tracks 14, 15, 16 and 17, respectively, of the top sheet 11. A reproducer 29 is moved along the sound tracks manually. For most convenient operation, the sound tracks 25 and 26 are made so that the correct sequence of sound runs from the rearward or bound edge of the sheet toward the free edge of the sheet. The sequence of sound along the sound strip 24 is preferably from the top toward the bottom of the sheet, and the same is true of the sound track 27. On the top sheet 11, the sequence of sound reproduction is the same way, that is, from the bound edge toward the free edge of the page for the sound tracks 15 and 16, and from the top toward the bottom of the sheet for the sound tracks 14 and 17.

The voices used for the sound tracks are preferably mezzo-soprano or baritone voices so that if the reproducer 29 is moved more slowly than intended, the voice heard will be a contralto or bass, but still satisfactory. If the reproducer 27 is moved more rapidly than intended, the voice reproduction will be soprano or tenor.

Figure 2:
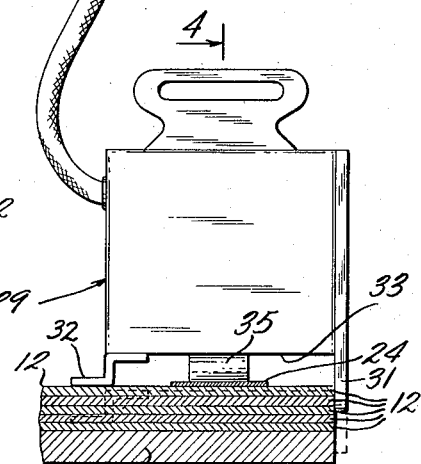
Figure 2 is an enlarged, diagrammatic, side view showing the way in which the reproducer is guided from the edges of the stack of sheets.

Figure 2 shows the way in which the reproducer 29 is guided by the edges of the sheets or pages 12. The edges of these pages are even with one another so that they provide a stiff shoulder 30 along which a guide plate 31 of the reproducer slides as the reproducer is moved along the page to follow the sound track of the strip 24. The face of the reproducer 29 is made with a skid or pressure plate 32 having a bottom surface that slides along the face of the top sheet 12 and that supports the reproducer 29 from the sheet adjacent to the sound strip 24. This construction eliminates wear on the sound strip.

A magnetic head 35 within the housing of the reproducer 29 is positioned directly over the sound track when the plate 31 is against the edges of the pages. In the preferred operation, the magnetic head 35 does not bear against the sound track but is positioned at a slight clearance from the sound track by the skid 32 when the reproducer is in use.

When using the reproducer with pages that have a large number of other pages beneath them, the plate 31 bears against the edges of the top page and a number of the underlying pages; but when the reproducer is being used with the sheets near the back of the book, the plate 31 extends down to the edge of a stiff cover 37 and it is one feature of the invention that the cover is somewhat smaller than on conventional books, so that its edges are substantially even with the edges of the pages 12 above the cover, for guiding the reproducer when the reproducer is in the position shown in dotted lines in Figure 2.

Although Figure 2 shows the reproducer guided from the right hand edges of the pages 12, it will be evident that the reproducer is used and guided in the same way along the upper and lower edges of the pages 12, and along the upper, lower and left-hand edges of the pages 11.

Figure 3:
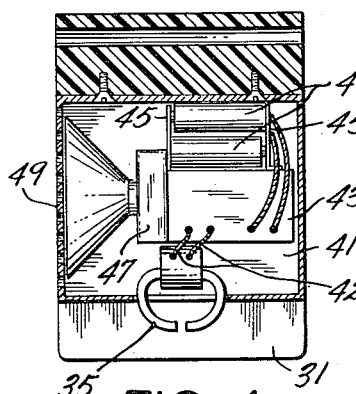
Figure 3 is a view, similar to Figure 2, showing the way in which the reproducer is guided by the fold between successive sheets of an open book.

Figure 3 shows the way in which the reproducer 29 is guided along the fold to traverse the sound track 27. In this case, the plate 31 or the skid 32 is pressed against the page opposite to the one on which the sound track is to be reproduced.

In the construction shown in Figures 1 to 3, the reproducer 29 is a self-contained unit requiring no wires and having the speaker in the same housing with the magnetic head.

Figures 4, 5:
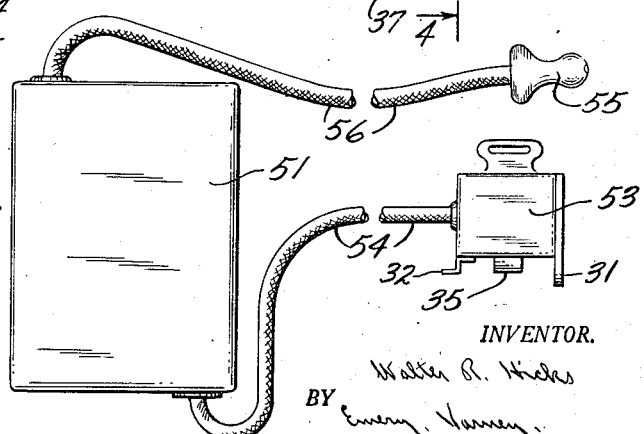
Figure 4 is an enlarged, diagrammatic, sectional view of the reproducer shown in Figures 1–3.
Figure 5 is an elevation showing a modified construction of the reproducer in which only the magnetic head is moved manually along the sound strip.

Figure 4 is a diagrammatic, sectional view of the reproducer 29. This view shows a housing 41 having the magnetic head 35 secured in the housing at its lower end. The magnetic head 35 has a conductor 42 connecting it with a power unit 43 having batteries 44 removably connected to a battery support 45 in the housing.

The power unit 46 contains an amplifier which supplies impulses to a speaker 47 in the upper end of the housing 41. The top or cover 49 of the housing is perforated to permit the sound to emerge from the speaker 47.

The reproducer 29 is simple and convenient to use, but because of its small size for its power, the batteries must be replaced at fairly frequent intervals in order to obtain the best performance. A larger power unit 51 is shown in Figure 5. In this modified form of the invention, the magnetic head 35 is carried by a small housing 53 of convenient size with a finger grip 54 for holding the reproducer and with the same guide plate 31 and skid 32 as the reproducer 29 for guiding the magnetic head 35 along the sound tracks on the margins of the pages.

The magnetic head carried by the housing 53 is connected by a conductor cable 54 to the power unit 51 in a housing 55. Within the power unit 51 there are batteries of a larger size and capacity than the batteries in the reproducer 29, and there is a speaker at the upper end of the housing 51. In the construction illustrated, this speaker is connected to an earpiece 55 by a tube 56 so that a person can use the apparatus without having it heard by other people in the room.

Figure 6:
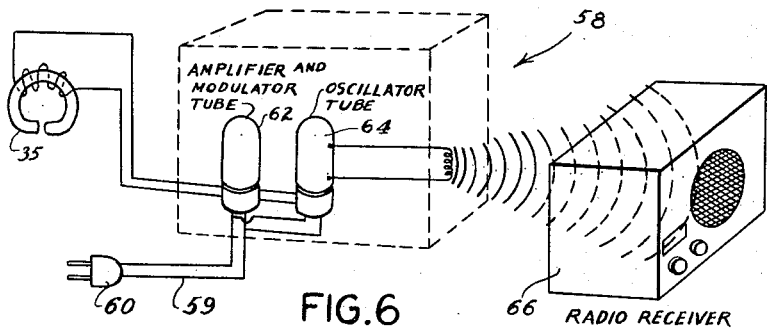
Figures 6 and 7 are diagrammatic views showing other modifications of the invention which have no speaker, but which are used with radio receivers, without having any wired connection to the radio receiver.

Figure 6 shows another form of the invention in which the magnetic head 35 is in a housing 53, similar to that shown in Figure 5, and connected with a power unit 58. This power unit is supplied with electricity through conductors 59 having a fitting 60 which plugs into a conventional electric outlet. Within the power unit 58 there is an amplifier and modulator tube 62 connected with a conventional circuit for such tubes; and there is also an oscillator tube 64 which supplies radiant impulses that are modulated by the audio signals supplied by the magnetic head through the amplifier and modulator tube 62. More than one amplification stage can be used where stronger impulses are needed.

The radiant energy from the power unit 58 passes to a radio receiver 66 located nearby, and the radio receiver is tuned to the frequency of the circuit of the oscillator tube 64. This modification of the invention is satisfactory where the frequency of the oscillator circuit is different from that of any nearby or strong radio stations; and the power from the unit 58 is not sufficient to interfere with other radios in adjacent apartments or homes. Because of this small power, no license is required. This modification of the invention has the advantage of utilizing the amplifier stages and the speaker of the radio receiver 66 so that it is not necessary to equip the invention with a speaker or with the same amplifier gain as is required for modifications which have their own speaker.

Figure 7:
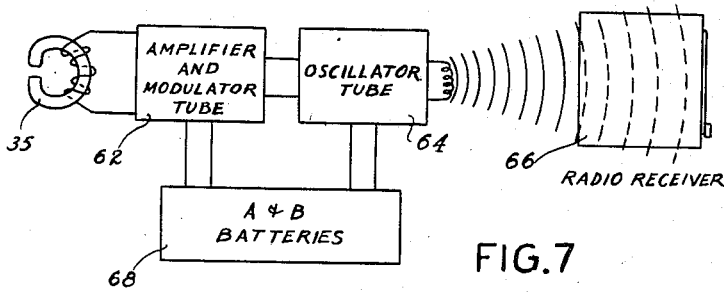

Figure 7 shows a modification of the construction illustrated in Figure 6. This modification in Figure 7 differs from the combination shown in Figure 6 in that it has the amplifier and modulator 62, and the oscillator 64, powered by A and B batteries in a housing 68 so that the unit is portable and need not be used within convenient reach of an electric power outlet. It must, however, be located close to the radio 66 because the radiant energy output of the oscillator 64 is low.

Figure 8:
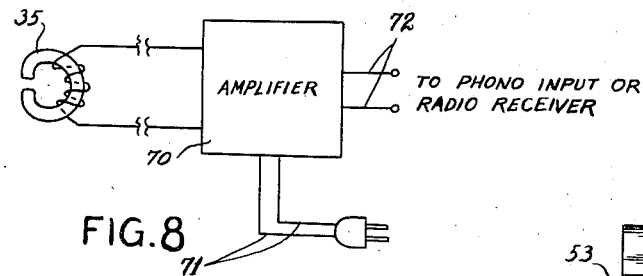
Figure 8 is a diagrammatic view showing another modification of the invention which has no speaker, but which uses conductors for connecting with the phonograph input of a conventional radio receiver.

Figure 8 shows still another modified form of the invention which differs from that of Figure 6 in that there is no oscillator in the power unit. The magnetic head 35 is operated with electricity from a power unit 70 which is connected with an electric outlet by a cable connector 71. The power unit 70 contains an amplifier and has conductors 72 which connect with the phonograph input of a conventional radio receiver. One advantage of this modification, shown in Figure 8, is that it is simpler and less expensive because of the elimination of the oscillator, and it can be used at a substantial distance from the radio by having long conductors 72.

Figure 9:
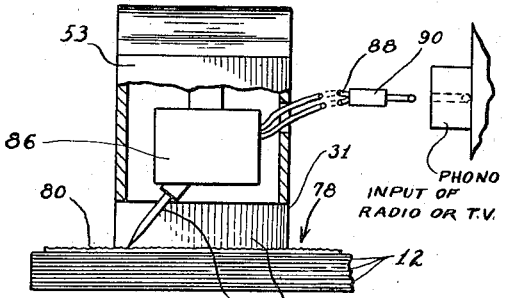
Figure 9 is a diagrammatic sectional view of another form of the invention.

Figure 9 shows another form of the invention in which the sound track is a strip 78 secured to the page 12 in the same way as the magnetic strips, of the other views; but the strip 78 has hill-and-dale undulations 80 extending across its top face for vibrating a blade 82, or other actuator, of a reproducer 84. The blade 82 operates a magnetic disc or crystal or magnetic pick-up 86 which is representative of a mechanically operated reproducer in which mechanical work done by oscillating the blade 82 is converted into electrical impulses in the conductors of a drop cord 88.

The crystal pick-up 86 is carried by the housing 53 in place of the magnetic reproducer shown in the other views. The strip 78 is preferably plastic, though other materials can be used.

Figure 10:
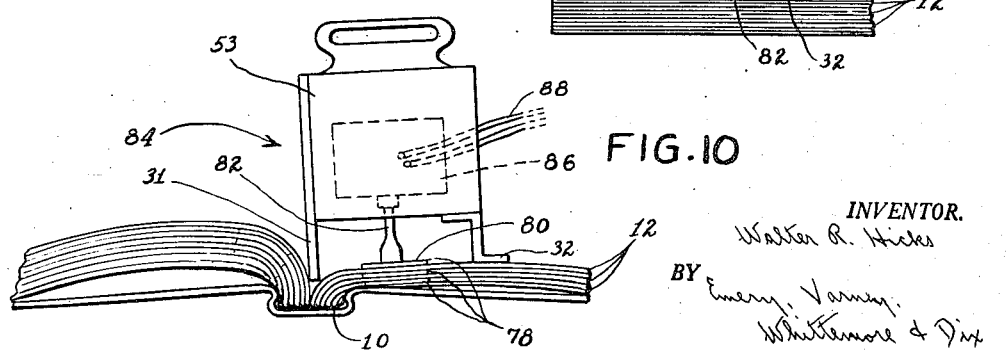
Figure 10 is an end view of the structure shown in Figure 9.

The drop cord 88 has a plug 90 connected to its free end for insertion into the phonograph input of a radio or television amplifier or connection with any other suitable amplifier. One of the advantages of the embodiment of the invention shown in Figures 9 and 10 is that it gives a stronger impulse than is obtained with a magnetic sound track. The impulses from the crystal or magnetic pick-up 86 can be supplied directly to the phonograph input of a conventional radio and do not require any pre-amplification as is the case with the weaker signals from the magnetic sound tracks.

The preferred embodiment and some modifications of the invention have been shown and described, but changes and modifications can be made and some features can be used alone or in different combinations without departing from the invention as defined in the claims.

What is claimed is:

1. A talking book comprising a plurality of pages bound together along their rearward edges with the edges of successive pages held together and in fixed relation to one another, and with the pages, on opposite sides of a place where the book is open, converging along surfaces that are at substantially less than 180 degrees of angular relation to one another, and a magnetic sound track on each of a plurality of said pages and adjacent to and parallel with the bound edges of the pages, and a reproducer having guide means that extend into the space between the converging pages adjacent to their bound edges and that contact simultaneously with the converging surfaces of both pages when the reproducer is in working position over the sound track, the guide means being movable along said surfaces to guide the reproducer in its movement along the sound track.

2. A talking book comprising a plurality of pages bound together along their rearward edges with the edges of successive pages held together and in fixed relation to one another, and with the pages, on opposite sides of a place where the book is open, converging along surfaces that are at substantially less than 180 degrees of angular relation to one another, and a sound track on each of a plurality of said pages and adjacent to and parallel with the bound edges of the pages, and a reproducer having guide means that contact both of said surfaces simultaneously when the reproducer is in working relation to the sound track, the guide means being movable along said surfaces of the pages on opposite sides of the line at which the open pages converge at the binding to guide the reproducer along the sound track.

3. A talking book comprising a plurality of pages bound together along their rearward edges with successive pages emerging left and right from the bound rearward edges when the book is open so that the adjacent page surfaces nearest the bound edges are substantially less than 180° of angular relation to each other, and a sound track on each of a plurality of page surfaces nearest the bound edges, said sound tracks located adjacent to and parallel with the bound page edges, and a reproducing head with surfaces to match with the parallel adjacent surfaces of two pages constituting the book opening, with surfaces of head and pages forming a guide means whereby the reproducing head may be moved evenly along the sound track substantially parallel with the sound track along its entire length, from top to bottom or from bottom to top of the book pages.

4. A book including pages connected together along adjacent edges so as to form a recess where the pages come together when the book is open, a sound track along at least one of the pages, parallel to said recess, the sound track having hill-and-dale undulations for vibrating an actuator which is moved along the length of the sound track, and a reproducer head having electrical conductors and a signal impulse generator connected in the circuit with the conductors and operated by the actuator to generate signals in the conductors corresponding with the vibrations imparted to the actuator by the undulations of the sound track, and guide means for the reproducer including an element that slides in the recess between the pages when the generator actuator is in position to move lengthwise along the sound track.

References Cited in the file of this patent

UNITED STATES PATENTS

| | | |
|---|---|---|
| 2,369,572 | Kallmann | Feb. 13, 1945 |
| 2,548,011 | Frost | Apr. 10, 1951 |
| 2,585,913 | Camras | Feb. 19, 1952 |